(12) United States Patent
Henriksson

(10) Patent No.: US 8,532,033 B2
(45) Date of Patent: Sep. 10, 2013

(54) SELECTIVE RAB ASSIGNMENT

(75) Inventor: Anders Henriksson, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 760 days.

(21) Appl. No.: 12/095,834

(22) PCT Filed: Dec. 2, 2005

(86) PCT No.: PCT/IB2005/054020
§ 371 (c)(1),
(2), (4) Date: Jun. 2, 2008

(87) PCT Pub. No.: WO2007/063358
PCT Pub. Date: Jun. 7, 2007

(65) Prior Publication Data
US 2008/0291872 A1    Nov. 27, 2008

(51) Int. Cl.
*H04W 4/00*    (2009.01)
(52) U.S. Cl.
USPC ....... 370/329; 370/252; 370/395.21; 370/401
(58) Field of Classification Search
USPC ................. 370/328, 338, 349, 395.2, 395.21, 370/401
See application file for complete search history.

(56) References Cited

U.S. PATENT DOCUMENTS

| | | | | |
|---|---|---|---|---|
| 6,636,491 | B1 * | 10/2003 | Kari et al. | 370/328 |
| 6,636,502 | B1 * | 10/2003 | Lager et al. | 370/352 |
| 6,701,155 | B2 * | 3/2004 | Sarkkinen et al. | 455/515 |
| 6,845,095 | B2 * | 1/2005 | Krishnarajah et al. | 370/349 |
| 7,453,805 | B2 * | 11/2008 | Velev et al. | 370/231 |
| 7,693,102 | B2 * | 4/2010 | Hayashi | 370/329 |
| 2002/0036983 | A1 * | 3/2002 | Widegren et al. | 370/230.1 |
| 2002/0114305 | A1 * | 8/2002 | Oyama et al. | 370/338 |
| 2005/0117590 | A1 * | 6/2005 | Ronneke | 370/395.52 |
| 2006/0072526 | A1 * | 4/2006 | Rasanen | 370/338 |

OTHER PUBLICATIONS

3GPP TS 23.060 V6.9.0 (Jun. 2005) 3rd Generation Partnership Project; Technical Specification Group Services and System Aspects; General Packet Radio Service (GPRS): Service description; Stage 2 (Release 6).
"White Paper WCDMA Evolved the first step—HSDPA" May 2004 284 23/2958 Uen Rev A Ericsson AB 2004.
"Basic Concepts of WCDMA Radio Access Network" Ericsson Radio Systems AB 2001 AE/LZT 123 6982.

* cited by examiner

*Primary Examiner* — Christopher Grey
(74) *Attorney, Agent, or Firm* — Roger S. Burleigh

(57) ABSTRACT

Method of controlling radio access bearer setup in a radio network, wherein a set of pre-determined RAB setup criteria are defined, the method comprising the steps of—receiving from a mobile station an Activate PDP Context Request (1) including RAB selection parameter, —evaluating the request from the mobile station (not shown) and if positive send a Create PDP Context Request (4) to a gateway node (GGSN), —evaluating (4B) the response from the gateway (GGSN) and if receiving a positive response, —evaluating (4C) RAB setup criteria for the mobile station, —if at least one RAB setup criteria evaluation is positive performing RAB set-up (5), and—if the RAB setup is successful (5B), transmitting a PDP Context Accept message (9) to the mobile station. Alternatively, the method comprises the steps of—receiving from a mobile station an Activate PDP Context Request (1) including a RAB selection parameter, —evaluating the request from the mobile station (not shown) and if the evaluation is positive sending a Create PDP Context Request (4) to a gateway node (GGSN), —evaluating (4B) the response from the gateway (GGSN) and if receiving a positive a Create PDP Context Response, and—unconditionally transmitting a PDP Context Accept message (9) to the mobile station.

21 Claims, 6 Drawing Sheets

SELECTIVE RAB ASSIGNMENT

FIELD OF THE INVENTION

The present invention relates to packet data communications systems such as GSM and code division multiplex access (CDMA) systems such as UMTS systems (W-CDMA (Wideband Code Division Multiplex Access)). More particularly, the present invention relates to aspects of Radio access bearer setup in 3GPP (Third Generation Partnership Project) systems.

BACKGROUND OF THE INVENTION

The main purpose of the WCDMA Radio Access Network, see schematic example given in FIG. 1, is to provide a connection between the handset and the core network and to isolate all the radio issues from the core network. The advantage is one core network supporting multiple access technologies.

As is well known, the WCDMA Radio Access Network Comprises Two Types of Nodes:

The Radio Base Station (Node B) handles the radio transmission and reception to/from the handset over the radio interface (Uu). It is controlled from the Radio Network Controller via the Iub interface. One Radio Base Station can handle one or more cells.

The Radio Network Controller (RNC) controls all WCDMA Radio Access Network functions. It connects the WCDMA Radio Access Network to the core network via the Iu interface. There are two distinct roles for the RNC, to serve and to control. The Serving Network controller has overall control of the handset that is connected to WCDMA Radio Access Network. It controls the connection on the Iu interface for the handset and it terminates several protocols in the contact between the handset and the WCDMA Radio Access Network. The Controlling RNC has the overall control of a particular set of cells, and their associated base stations.

When a handset requires resources in a cell that are not controlled by its Serving RNC, the Serving RNC must ask the Controlling RNC for those resources. This request is made via the Iur interface, which connects the RNC with each other. In this case, the Controlling RNC is also said to be a Drift RNC for this particular handset. This kind of operation is primarily needed to be able to provide soft handover throughout the network.

The main service offered by WCDMA RAN is providing the Radio Access Bearer (RAB). To establish a call connection between the handset and the base station a RAB is needed. The characteristics of the Radio Access Bearers are different depending on what kind of service/information is to be transported.

The RAB carries the subscriber data between the handset and the core network. It is composed of one Radio Bearer between the handset and the Serving RNC, and one Iu bearer between the Serving RNC and the core network.

The 3GPP standardisation body has defined four different quality classes of Radio Access Bearers:
  Conversational (used for e.g. voice telephony)
  low delay, strict ordering
  Streaming (used for e.g. watching a video clip)
  moderate delay, strict ordering
  Interactive (used for e.g. web surfing)
  moderate delay
  Background (used for e.g. file transfer)
  no delay requirement Both the Conversational and Streaming RABs require a certain reservation of resources in the network, and are primarily meant for real-time services. The latter RAB types differ mainly in that the Streaming RAB tolerates a higher delay as long as the delay variation is kept low, appropriate for one-way real-time services.

The Interactive and Background RABs are also called 'best effort', i.e. no resources are reserved and the throughput depends on the load in the cell. The only difference between the latter RAB's is that the Interactive RAB provides a priority mechanism.

The RAB is characterized by certain Quality of Service (QoS) parameters, such as bit rate and delay.

The core network will select a RAB with appropriate QoS based on the service request from the subscriber, and ask the RNC to provide such a RAB.

Transport in WCDMA Radio Access Network

The WCDMA Radio Access Network nodes communicate with each other over a trans-port network. The 3GPP specifications provide a very clear split between radio related (WCDMA) functionality and the transport technology, meaning that there is no particular bias to any technology. The transport network may be based on ATM (Asynchronous Transfer Mode) or IP (Internet Protocol).

Transport of packet data units (PDU) between a user entity and a packet data provider network is achieved by means of the GTP (GPRS (General Packet Radio System) Tunnelling Protocol) protocol. The tunnelling protocol utilises encapsulation of Internet packets in GTP packets.

The tunnelling is setup via so-called Packet Data Protocol (PDP) contexts, which exist in the user entities, the SGSN (Serving GPRS Support Node) and the GGSN (Gateway GPRS Support Node). Moreover, the service characteristics of the transmission of PDU are controlled according to the established PDP context. In order to transmit or receive data the user entity must be attached, inferring that a "radio connection" is established between the user entity and the radio base station and a PDP context is activated.

The PDP context comprises
  type of the PDP Network (IP or PPP)
  address of terminal (IP or PPP)
  IP address of SGSN
  NSAPI (the logical identifier of the PDP context)
  APN: Logical name of the external network (www.internet.com)
  Qos In document 3GPPTS23.060 V6.9.0, the procedure for PDP-context activation, -modification, -deactivation and -preservation functions are explained.

In FIGS. 2 and 3, the procedure for one known RAB assignment is shown. This procedure corresponds to the PDP Context Activation Procedure for Iu mode, confer, FIG. 64, 3GPP TS 23.060 V6.9.0 (2005-06).

According to the above document, an activate PDP context request is transmitted to the SGSN [0088], corresponding to step 4b in FIG. 3. Subsequently, the GGSN sends a "create PDP context request" to the SGSN carrying a signalling QoS indicator [0090], corresponding to step 4b. Thereafter, the SGSN, sends a RAP assignment request (RANAP) message to the RNC in the UTRAN with the signalling QoS indicator [0091]. Subsequently, the usual steps shown in FIG. 3 are performed.

Thereafter, the SGSN performs the known RAB setup procedure 5.

On the other hand, if the GGSN sends a negative response, the SGSN sends an Activate PDP Context Reject message 9' to the mobile station.

The GGSN responds by sending a Create PDP Context Response to the SGSN, step 4'.

Dependent on the outcome of the RAB setup procedure, the SGSN sends an Activate PEW Context Accept message, 9, if the RAB setup was successful or an "Activate POP Context Reject message 9' if the RAB set-up failed. The RAB set up could fail for various reasons such as insufficient link conditions.

Those mobile stations for which the PDP Context activation attempt failed will have to try again to activate the PDP Context at a later stage. This might require manual interaction from the user.

Prior art document US2002/0114305 shows a signalling bearer quality of service profile being pre-established and configured in various nodes in a GPRS/UMTS network.

According to the above document, an activate PDP context request is transmitted to the SGSN [0088], corresponding to step 4b in FIG. 3. Subsequently, the GGSN sends a "create PDP context request" to the SGSN carrying a signalling QoS indicator [0090], corresponding to step 4b. Thereafter, the SGSN, sends a RAP assignment request (RANAP) message to the RNC in the UTRAN with the signalling QoS indicator [0091]. Subsequently the usual steps shown in FIG. 3 is performed. This document forms the preamble of claim 1.

In the above document no evaluation is performed as to RAB set-up criteria being positive or negative, after the SGSN receiving a positive PDP context response from the GGSN, leading to a subsequent omission of a RAB assignment, as in the first embodiment of the present invention.

Prior art document US2002/0036983 shows a mobile station initiated PDP context activation procedure in FIG. 15. After a RAB assignment incomplete message 7 is received by the SGSN, the SGSN responds by issuing a create PDP context request 9 including negotiated QoS to the GGSN. The GGSN issues a Create PDP context response message 10 which is relayed back to the mobile station. Both the SGSN and the GGSN can modify the requested QoS profile. There are several local admission controls taking place in the procedure. However, since bandwidth associated with radio is the most expensive resource, the UTRAN is consulted in determining whether radio resources are available or not during PDP context activation or modification. Thus, admission control in UMTS is performed in a radio centric manner.

It is understood that if the RAB assignment complete 7 is not received by the SGSN, the Activate PDP context accept 11 is not issued to the mobile station.

SUMMARY OF THE INVENTION

In existing networks, the RAB Assignment procedure is typically performed at PDP Context activation regardless if the RAB that is established will be used for data traffic immediately or later in time. This behaviour has the effect that radio network resources, such as CDMA code space are reserved unnecessarily resulting in a poorly utilized network. Especially for operators whose business models rely on always-on communication, the behaviour can affect service performance.

It is a primary object of the invention to reduce the number of PDP Context activation failures and to better utilise scarce radio network resources.

It is a secondary object of the invention to provide an alternative way of reducing the number of PDP Context activation failures and to better utilise scarce radio network resources.

Further advantages will appear from the following detailed description of the invention.

DETAILED DESCRIPTION OF PREFERRED EMBODIMENTS OF THE INVENTION

Figure 1:
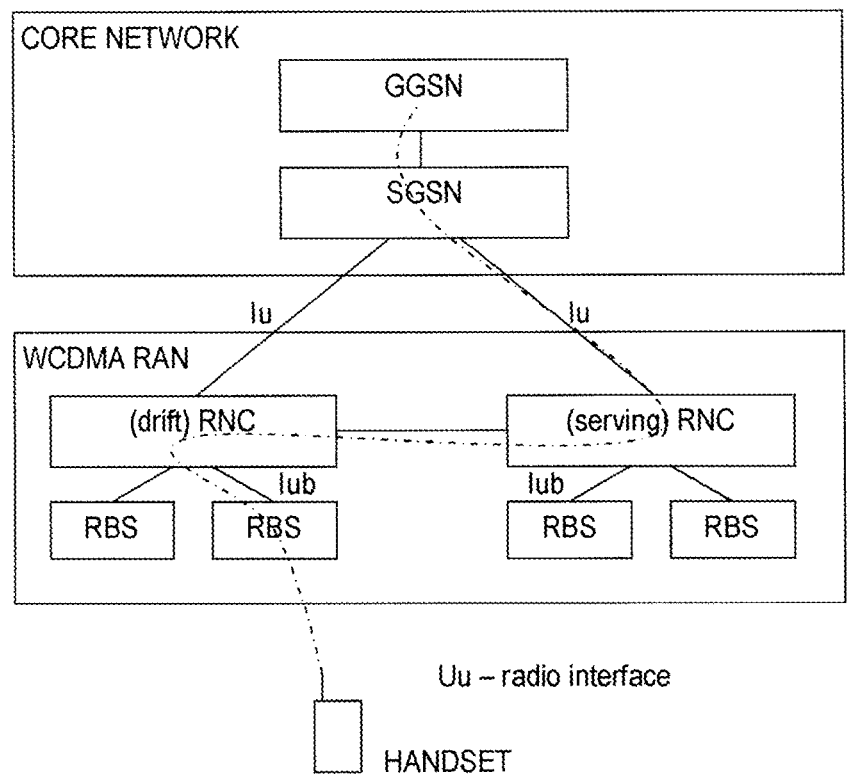
FIG. 1 shows parts of a prior art WCDMA network.
Figure 2:
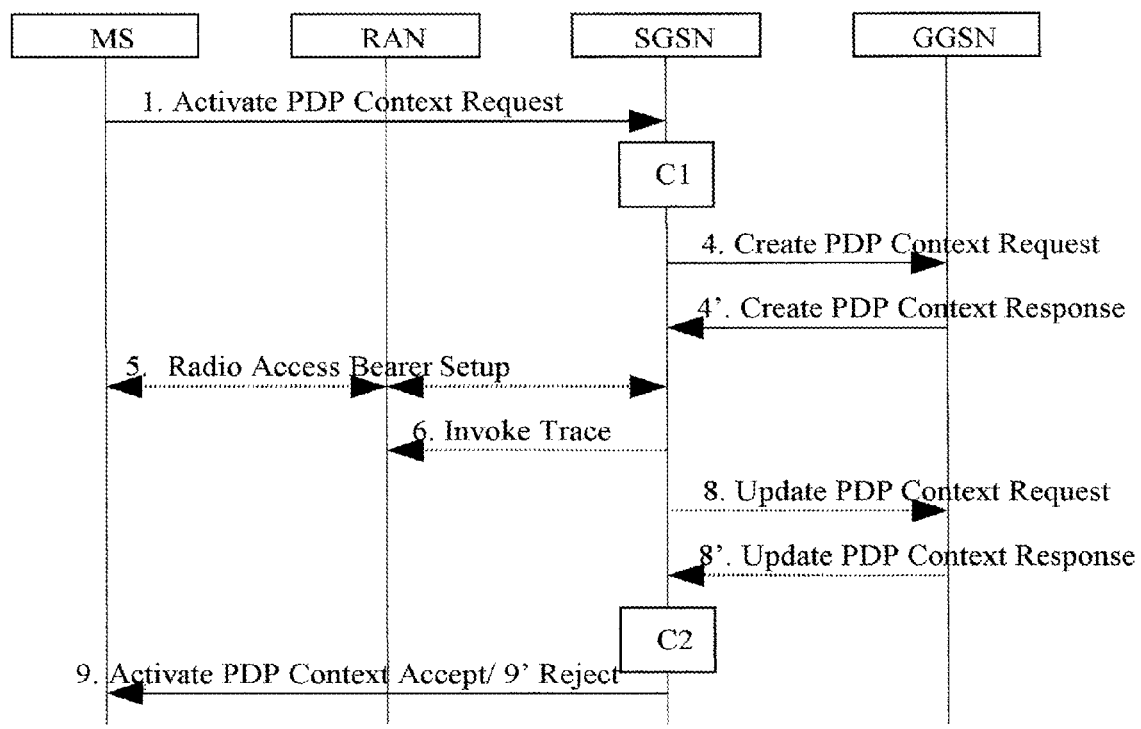
FIG. 2 shows a known radio access bearer assignment procedure.
Figure 3:
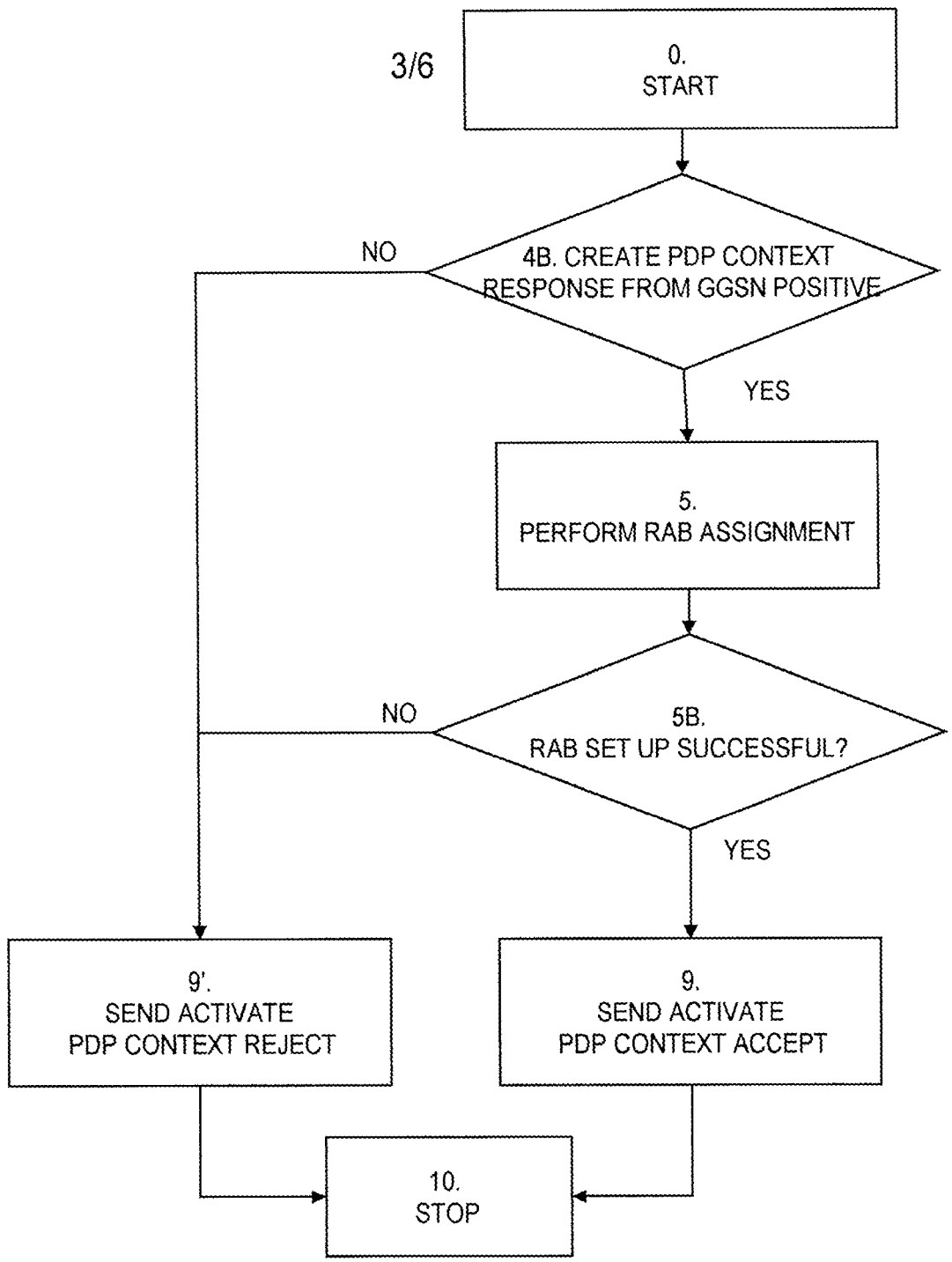
FIG. 3 shows a flow diagram pertaining to the known procedure of FIG. 2.

As illustrated in FIG. 2, when the SGSN receives an Activate PDP Context Request message 1 from a specific Mobile Station, it shall perform the Create PDP Context procedure towards the selected GGSN in the normal fashion as specified in the 3GPP specifications 23.060, 24.008 and 29.060, confer steps 2 and 3.

In the following, the reference signs of FIG. 2 shall be used where the invention carries out the same steps as known in the prior art. The present invention makes use of the same standard messages as those shown in FIG. 2. Therefore, those reference signs are kept for the illustration of the embodiments of the present invention.

As in the prior art, should the GGSN for some reason reject the PDP Context activation attempt 4, i.e. not issue a create PDP context response 4', the activation procedure is stopped 4B and the Mobile Station is notified with an Activate Context Reject message 9'. In this situation, the Selective RAB Assignment concepts according to the invention are not carried out.

On the other hand, if the Create PDP Context procedure, confer messages 4 and 4', towards the GGSN is successful, condition 4B, the SGSN will use the selective RAB Assignment procedures described in the following. According to a first aspect of the invention, the SGSN may act in different ways depending on the outcome of Selective RAB Assignment evaluation criteria. According to further aspects of the invention, no RAB assignment or no RAB set up evaluation is carried out.

First Embodiment of the Invention

According to a first aspect of the invention, user and/or service related information is applied as a criterion for when and how the radio network is requested to reserve resources during connection setup. More specifically, the SGSN uses subscription information readily available in the SGSN, to decide if the RAB Assignment procedure shall be run as part of a specific PDP Context activation procedure according to preferred embodiments of the present invention.

The selective RAB Assignment according to a first aspect of the invention is based on an evaluation being carried out on predetermined RAB set-up criteria 4B being based on information in the Mobility Management (MM) Context and/or the PDP Context. The contents of the MM Context and PDP Context are defined in the 3GPP specification 23.060. Typical fields that may be evaluated are the IMSI (International Mobile Sub-scriber Identity) and the Routeing Area in the MM Context and the APN (Access Point Name) and the QoS (Quality of Service) in the PDP Contexts.

Regarding the MM context evaluation criteria, the following criteria may be used:

Subscriber identity (IMSI) of the user (IMSI series)—the Selective RAB assignment function may be based on the identity of the user, e.g. to give users belonging to certain IMSI (International Mobile Subscriber Identity) series numbers special treatment. For instance, the operator's own service personnel may always be given exactly what they ask for.

Routeing Area—in specific Routeing Areas the SGSN may accept PDP Context activations even though no radio resources are available, e.g. in areas with large public sports arenas.

As regards the PDP Context evaluation criteria, the following criteria may be used according to the invention:

Access Point Name—for certain APNs the Selective RAB assignment function may require that radio resources are allocated for the PDP Context activation to be considered successful or vice versa e.g. when a user requests resources for a given pre-determined class of APN's, the group of APN's for instance counting important companies.

Quality of Service—for certain QoS classes the Selective RAB assignment function may require that radio resources are allocated for the PDP Context activation to be considered successful, e.g. radio resources must be allocated for "Conversational" or "Streaming" but not for "Background". According to the invention the RAB set-up criteria is positive for the two former QoS classes.

Figure 4:
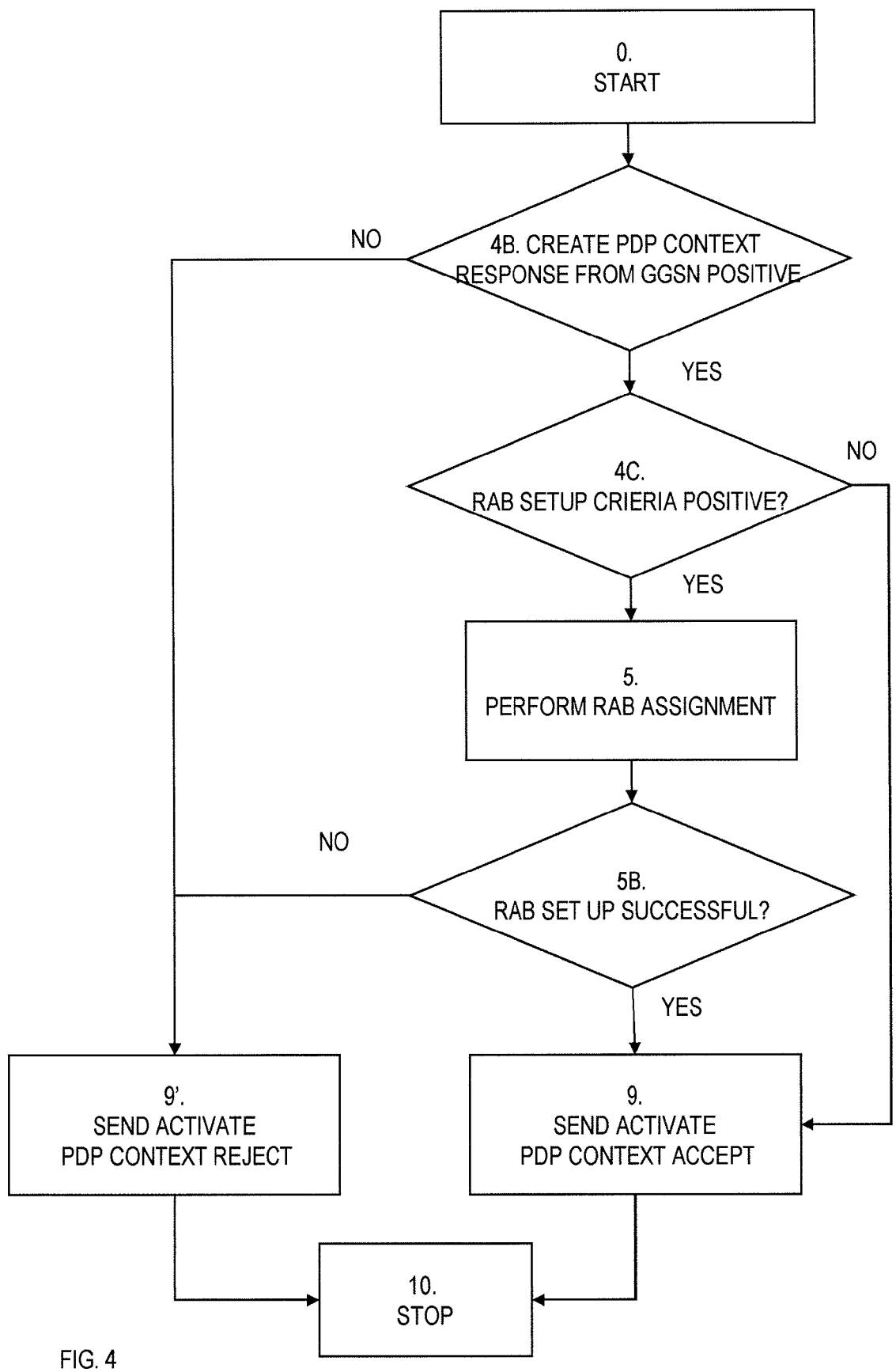
FIG. 4 shows a flow diagram of the first embodiment of the invention.

According to a first embodiment of the invention shown in FIG. 4, the PDP Context activation shall be explained where QoS=Best Effort is used as an evaluation criteria (if "Best effort" appears under 4B, then negative, otherwise positive).

There is provided Method of controlling radio access bearer setup in a radio network, wherein a set of predetermined RAB setup criteria 4C are defined, the method comprising the steps of receiving from a mobile station an Activate PDP Context Request (1) including RAB selection parameter,
evaluating the request from the mobile station (not shown) and if positive send a Create PDP Context Request (4) to a gateway node (GGSN).
evaluating (4B) the response from the gateway (GGSN) and if receiving a positive response,
evaluating (4C) the RAB setup criteria for the mobile station, and and the SGSN performs the known RAB setup procedure 5.
if the RAB setup criteria evaluation is positive, if for instance the mobile station on transmitted an Activate PDP Context Request to the SGSN with QoS="Conversational",
performing RAB set-up (5), and
if the RAB setup is successful (5B),
transmitting a PDP Context Accept message (9) to the mobile station.
If the RAB set up criteria evaluation above is negative (4C) the SGSN sends an Activate PDP Context Accept message (9) to the mobile station.
If the RAB set up above is not successful (5B) the SGSN sends an Activate PDP Context Reject message (9') to the mobile station.

In the above example it appears that mobile stations having a low quality of service level (Best effort) will not be allocated radio resources, when activating a PDP Context at e.g. power-on, whereas mobile stations with higher QoS will. Thereby the radio access bearer demand is reduced.

Second Embodiment of the Invention

Figure 5:
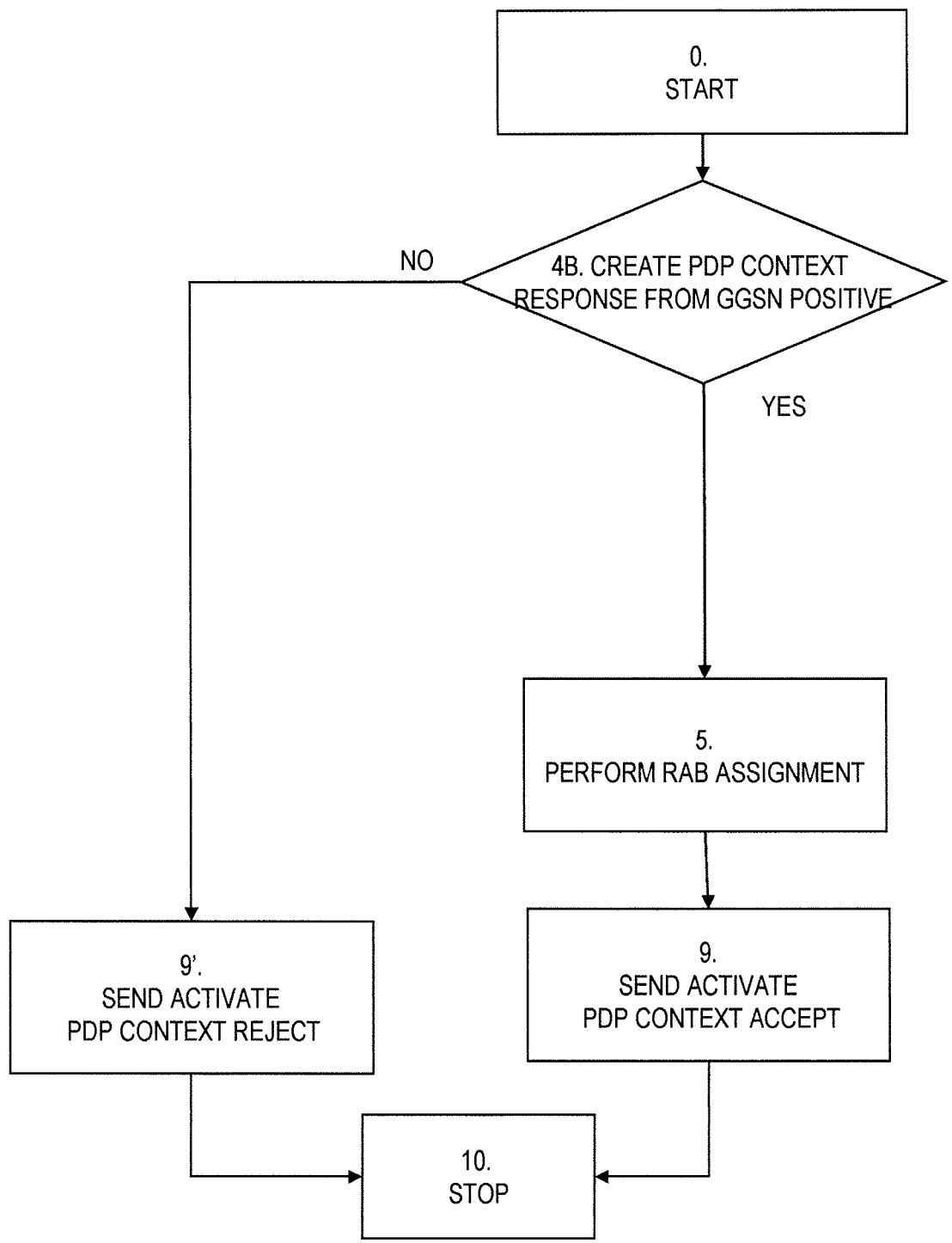
FIG. 5 shows a flow diagram of the second embodiment of the invention.

According to a second embodiment of the invention shown in FIG. 5, the RAB Assignment procedure is run unconditionally when the SGSN receives a Create PDP Response message. Hence, the SGSN will "consider" the PDP Context activation to be successful regardless of the result of the RAB Assignment procedure.

There is provided a method of controlling radio access bearer setup in a radio network, wherein a set of predetermine RAB setup criteria are defined. The method comprises the steps of the SGSN receiving from a mobile station an Activate PDP Context Request (1) including RAB selection parameter,
evaluating the request from the mobile station (not shown) and if the evaluation is positive sending a Create PDP Context Request (4) to a gateway node (GGSN),
evaluating (4B) the response from the gateway (GGSN) and if receiving positive a Create PDP Context Response,
unconditionally performing RAB set-up (5),
unconditionally transmitting a PDP Context Accept message (9) to the mobile station, such that the unconditional transmission of the PDP Context Accept message (9) to the mobile station is made independently from a potentially unsuccessful RAB set UP.

When the SGSN receives a positive Create PDP Context Response from the GGSN, the RAB assignment procedure 5 is carried out or at least initiated, whereupon an Activate PDP Context Accept is issued to the mobile station in question.

When the SGSN does not receive a positive Create PDP Context Response from the GGSN, the RAB assignment procedure 5 is not carried out, and an Activate PDP Context Reject 9' is issued to the mobile station in question as in the prior art.

This has the effect that if the RAB setup was successful, the mobile station will be able to communicate directly with e.g. the host in the Internet that provides the requested service with a minimum of setup delay.

If, on the other hand the RAB setup failed, the mobile station will still receive an Activate PDP Context Accept signal from the SGSN but it will have to perform a separate Service Request and RAB assignment in order to send and receive data. However, the mobile station needs not to perform a complete PDP Context activation procedure. A second attempt to activate the service as a RAB assignment according to the second embodiment is much quicker than a complete PDP Context activation as the GGSN communication and parts of the QoS negotiation are already done. This again has the effect that the second service setup attempt will be quicker and it will not require any manual intervention as the standalone RAB assignment procedure takes shorter time and is less susceptible to failures than the complete PDP Context activation procedure.

Third Embodiment of the Invention

FIG. 6

Figure 6:
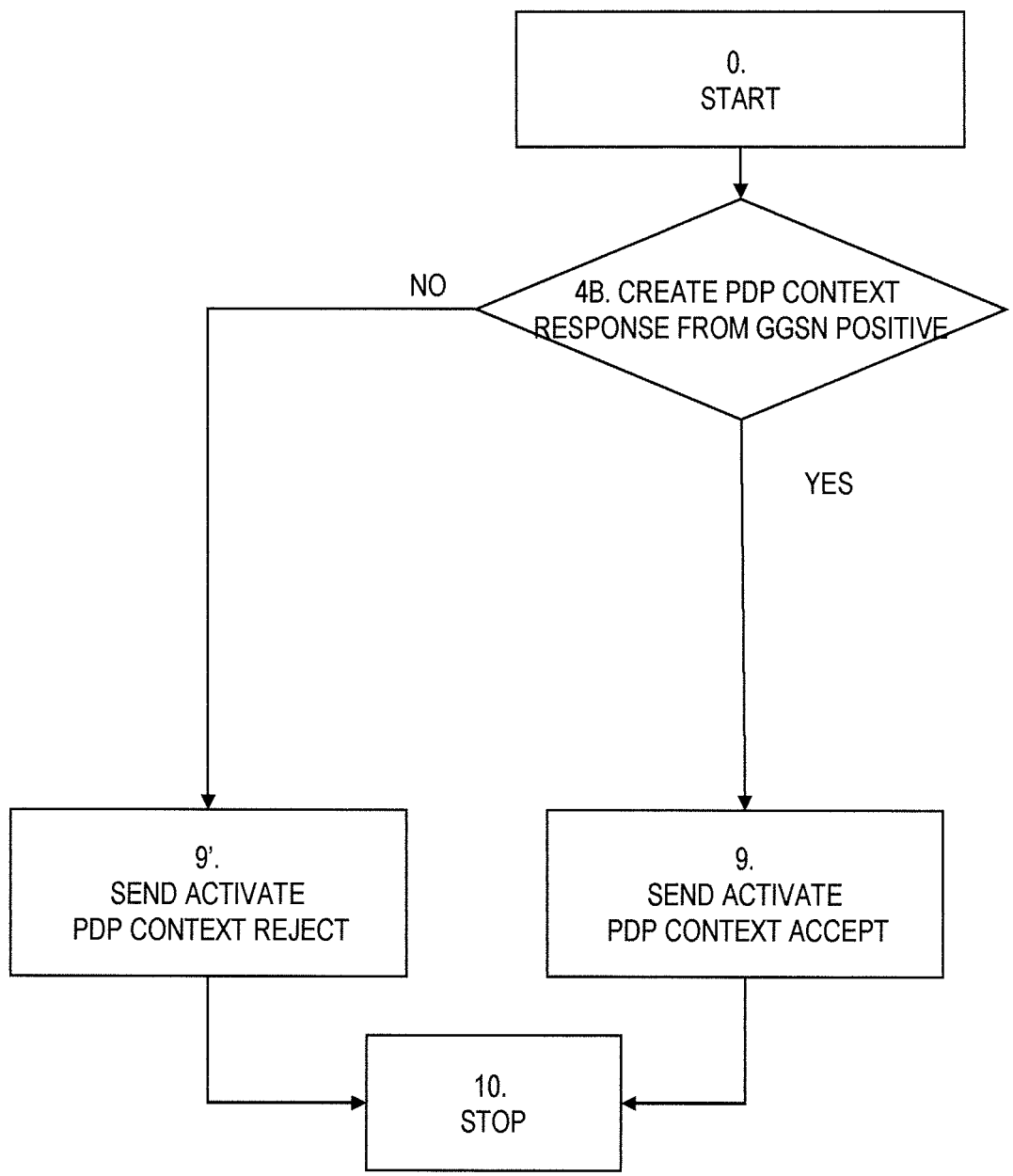
FIG. 6 shows a flow diagram of the third embodiment of the invention.

According to the third embodiment of the invention shown in FIG. 6, the SGSN, if receiving a Create PDP context Response message, i.e. the SGSN performs the finding that the response from the GGSN is positive, transmits an Activate Context Accept 9. That is done without a RAB setup even being initiated.

If no Create PDP context response is received, it is found that the response from the GGSN is negative, whereupon the SGSN transmits an Activate PDP Context Reject 9' message to the mobile station.

This has the effect that for services that do not require that a communication path is setup through the network immediately at PDP Context activation, no RABs are setup at a time where they are not a seen as needed. This again has the effect that less radio resources are wasted and less radio interference is created as the RABs that would otherwise have been setup would need resources such as but not limited to signal code space and output power from the mobile station and the network base stations. The main benefit with the third embodiment is that for services that do not require a RAB to be setup immediately there is no extra signalling and less radio resources are wasted.

The invention claimed is:

1. A method in a Serving GPRS Support Node (SGSN) of controlling radio access bearer setup, wherein a set of predetermined radio access bearer (RAB) setup criteria are defined, the method comprising the steps of:
   receiving from a mobile station an Activate Packet Data Protocol (PDP) Context Request including a RAB selection parameter;
   evaluating the Activate PDP Context Request from the mobile station and, if positive, sending a Create PDP Context Request to a gateway node;
   evaluating, in said SGSN, a response from the gateway node, and:
      if a positive response is received, evaluating, in said SGSN, one or more of said set of predetermined RAB setup criteria for the mobile station; and,
      if the evaluation of one or more of said set of predetermined RAB setup criteria is negative, refraining from performing RAB assignment.

2. The method according to claim 1, wherein if the RAB setup criteria evaluation is negative, the SGSN sends an Activate PDP Context Accept message to the mobile station.

3. The method according to claim 1, wherein if the RAB setup is not successful, the SGSN sends an Activate PDP Context Reject message to the mobile station.

4. The method according to claim 1, wherein if the RAB setup is successful, the SGSN sends an Activate PDP Context Accept message to the mobile station.

5. The method according to claim 1, wherein the RAB setup criteria comprises the quality of service class pertaining to the mobile station such that if the service class is best effort, the evaluation of the criteria is negative.

6. The method according to claim 1, wherein if the evaluation of the predetermined RAB setup criteria is positive, performing RAB assignment.

7. The method according to claim 1, wherein if the RAB setup is successful, transmitting a PDP Context Accept message to the mobile station.

8. A method in a Serving GPRS Support Node (SGSN) of controlling radio access bearer setup, wherein a set of predetermined radio access bearer (RAB) setup criteria are defined, the method comprising the steps of:
   receiving from a mobile station an Activate Packet Data Protocol (PDP) Context Request including a RAB selection parameter;
   evaluating the Activate PDP Context Request from the mobile station and, if positive, sending a Create PDP Context Request to a gateway node;
   evaluating a response from the gateway node, and:
      if a positive response is received, evaluating one or more of said set of predetermined RAB setup criteria for the mobile station, wherein the RAB setup criteria comprises an Internet host address pertaining to a service subscribed to by the mobile station such that if the address belongs to a certain range or group, the evaluation of the criteria is negative; and,
      if at least one of said evaluated RAB setup criteria is negative, refraining from performing RAB assignment.

9. The method according to claim 8, wherein if the RAB set up criteria evaluation is negative, the SGSN sends an Activate PDP Context Accept message to the mobile station.

10. The method according to claim 8, wherein if the RAB set up is not successful, the SGSN sends an Activate POP Context Reject message to the mobile station.

11. The method according to claim 8, wherein if the RAB setup is successful, the SGSN sends an Activate POP Context Accept message to the mobile station.

12. The method according to claim 8, wherein the RAB setup criteria comprises the quality of service class pertaining to the mobile station such that if the service class is best effort, the evaluation of the criteria is negative.

13. The method according to claim 8, wherein if the evaluation of the predetermined RAB setup criteria is positive, performing RAB assignment.

14. The method according to claim 8, wherein if the RAB setup is successful, transmitting a PDP Context Accept message to the mobile station.

15. A method in a Serving GPRS Support Node (SGSN) of controlling radio access bearer setup, wherein a set of predetermined radio access bearer (RAB) setup criteria are defined, the method comprising the steps of:
   receiving from a mobile station an Activate Packet Data Protocol (POP) Context Request including a RAB selection parameter;
   evaluating the Activate POP Context Request from the mobile station and, if positive, sending a Create PDP Context Request to a gateway node;
   evaluating a response from the gateway node, and:
      if a positive response is received, evaluating one or more of said set of predetermined RAB setup criteria for the mobile station, wherein the RAB setup criteria comprises a network address pertaining to the part of the network in which the mobile station is currently located such that if the address belongs to a certain group, the evaluation of the criteria is negative; and,
      if at least one of said evaluated RAB setup criteria is negative, refraining from performing RAB assignment.

16. The method according to claim 15, wherein if the RAB setup criteria evaluation is negative, the SGSN sends an Activate POP Context Accept message to the mobile station.

17. The method according to claim 15, wherein if the RAB setup is not successful, the SGSN sends an Activate PDP Context Reject message to the mobile station.

18. The method according to claim 15, wherein if the RAB setup is successful, the SGSN sends an Activate PDP Context Accept message to the mobile station.

19. The method according to claim 15, wherein the RAB setup criteria comprises the quality of service class pertaining to the mobile station such that if the service class is best effort, the evaluation of the criteria is negative.

20. The method according to claim 15, wherein if the evaluation of the predetermined RAB setup criteria is positive, performing RAB assignment.

21. The method according to claim 15, wherein if the RAB setup is successful, transmitting a POP Context Accept message to the mobile station.

\* \* \* \* \*

UNITED STATES PATENT AND TRADEMARK OFFICE
CERTIFICATE OF CORRECTION

PATENT NO.        : 8,532,033 B2
APPLICATION NO.   : 12/095834
DATED             : September 10, 2013
INVENTOR(S)       : Henriksson It is certified that error appears in the above-identified patent and that said Letters Patent is hereby corrected as shown below:

On the Title Page, Item (56), under "OTHER PUBLICATIONS", in Column 2, Line 3, delete "(GPRS):" and insert -- (GPRS); --, therefor.

On the Title Page, Item (56), under "OTHER PUBLICATIONS", in Column 2, Line 6, delete "23/2958" and insert -- 23-2958 --, therefor.

In the Figure, in Box "4C.", in Line 1, delete "CRIERIA" and insert -- CRITERIA --, therefor.

In the Drawings

In Fig. 4, Sheet 4 of 6, in Box "4C.", in Line 1, delete "CRIERIA" and insert -- CRITERIA --, therefor.

In the Specification

In Column 1, Line 6, delete "multiplex" and insert -- multiple --, therefor.

In Column 1, Line 8, delete "Multiplex" and insert -- Multiple --, therefor.

In Column 1, Line 23, delete "Comprises Two Types of Nodes:" and insert -- comprises two types of nodes: --, therefor.

In Column 1, Line 67, delete "requirement" and insert -- requirement. --, therefor.

In Column 2, Line 19, delete "trans-port" and insert -- transport --, therefor.

In Column 3, Line 4, delete "PEW Context" and insert -- PDP Context --, therefor.

Signed and Sealed this
First Day of April, 2014

Michelle K. Lee
*Deputy Director of the United States Patent and Trademark Office*

CERTIFICATE OF CORRECTION (continued)
U.S. Pat. No. 8,532,033 B2

In Column 3, Line 5, delete ""Activate POP" and insert -- "Activate PDP --, therefor.

In Column 4, Line 67, delete "Sub-scriber" and insert -- Subscriber --, therefor.

In Column 5, Line 50, delete "and the" and insert -- the --, therefor.

In the Claims

In Column 8, Line 16, in Claim 10, delete "POP" and insert -- PDP --, therefor.

In Column 8, Line 19, in Claim 11, delete "POP" and insert -- PDP --, therefor.

In Column 8, Line 36, in Claim 15, delete "(POP)" and insert -- (PDP) --, therefor.

In Column 8, Line 38, in Claim 15, delete "POP" and insert -- PDP --, therefor.

In Column 8, Line 54, in Claim 16, delete "POP" and insert -- PDP --, therefor.

In Column 9, Line 2, in Claim 21, delete "POP" and insert -- PDP --, therefor.